United States Patent
Mangold et al.

(10) Patent No.: US 7,570,766 B2
(45) Date of Patent: Aug. 4, 2009

(54) TRANSPARENTLY EMBEDDING NON-COMPLIANT DATA IN A DATA STREAM

(75) Inventors: Richard P. Mangold, Forest Grove, OR (US); Keith L. Shippy, Tempe, AZ (US); Ajit P. Joshi, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 823 days.

(21) Appl. No.: 10/087,576

(22) Filed: Mar. 1, 2002

(65) Prior Publication Data

US 2003/0167397 A1 Sep. 4, 2003

(51) Int. Cl.
*H04L 9/00* (2006.01)
(52) U.S. Cl. .......................................... 380/260; 380/43
(58) Field of Classification Search .................. 380/217, 380/221, 277, 278, 37, 43, 260, 286; 713/160, 713/162
See application file for complete search history.

(56) References Cited

U.S. PATENT DOCUMENTS

| 5,548,648 | A | * | 8/1996 | Yorke-Smith | 713/193 |
| 5,706,348 | A | * | 1/1998 | Gray et al. | 713/160 |
| 5,805,705 | A | * | 9/1998 | Gray et al. | 713/160 |
| 5,878,135 | A | * | 3/1999 | Blatter et al. | 380/239 |
| 5,987,137 | A | * | 11/1999 | Karppanen et al. | 380/28 |
| 6,539,094 | B1 | * | 3/2003 | Osakabe et al. | 380/283 |
| 6,766,451 | B1 | * | 7/2004 | Van Rijnsoever | 713/160 |
| 7,003,111 | B2 | * | 2/2006 | Jaquette | 380/46 |
| 7,383,435 | B2 | * | 6/2008 | Fellerer | 713/160 |
| 2001/0007127 | A1 | * | 7/2001 | Staring | 713/160 |
| 2002/0110245 | A1 | * | 8/2002 | Gruia | 380/278 |
| 2002/0146130 | A1 | * | 10/2002 | Dellow | 380/277 |
| 2003/0035649 | A1 | * | 2/2003 | Chung et al. | 386/111 |
| 2003/0050015 | A1 | * | 3/2003 | Kelly et al. | 455/67.4 |
| 2003/0156715 | A1 | * | 8/2003 | Reeds et al. | 380/37 |

* cited by examiner

*Primary Examiner*—Beemnet W Dada
(74) *Attorney, Agent, or Firm*—Blakely, Sokoloff, Taylor & Zafman LLP (57) ABSTRACT

Systems, methods, and data structures for transparently embedding non-compliant data in a data stream are described. One method includes embedding random encryption/decryption information into an MEPG multimedia, video, or audio stream transparently to an MPEG decoder in an ISO/MPEG 13818-1 compliant system to control access. The invention works for variable length data streams and involves a PES header. Spare bytes, stuffing bytes, or additional bytes as defined in the MPEG specification for PES headers are used to store key information by a computer capable of modifying the original data stream. There is no need for a parallel data stream for the key information because the key information is transparently inserted directly into the data stream. Additional information is embedded into the data stream that can be used for encryption/decryption without having to modify other components in a playback system.

24 Claims, 8 Drawing Sheets

TRANSPARENTLY EMBEDDING NON-COMPLIANT DATA IN A DATA STREAM

BACKGROUND

High value digital content, such as multimedia, audio, and video content must be encrypted to prevent illicit access and usage of the data stream while it is transmitted between devices. Data streams are often transmitted in a lossy environment where data bits may be lost during transmission. Synchronization points in the data stream permit recovery from data loss and processing of the rest of the file. If the data stream is encrypted, then a playback system needs some way to synchronize key information used to decrypt the data stream. However, some standards, such as the Moving Pictures Experts Group (MPEG) standards, (See ISO/IEC 13818-1) provide no way to synchronize key information. Any attempt to embed key information into the data stream causes a standard-compliant decoder to fail. Alternatively, maintaining a parallel data stream for key information is complex and unwieldy. If the data stream is encrypted, there is no way to recover once data is lost. On the other hand, if the data stream is not protected with encryption, there is a way to recover. One should not have to choose between encrypting a data stream with no way to recover from data loss or not encrypting.

DETAILED DESCRIPTION

Systems, methods, and data structures for transparently embedding non-compliant data in a data stream are described. In the following detailed description, reference is made to the accompanying drawings, which are part of this application. These drawings illustrate specific embodiments for practicing the present invention and reference numbers refer to substantially similar components throughout the drawings. The embodiments are described in sufficient detail to enable those skilled in the art to practice the present invention. Other embodiments may be used and structural, logical, electrical, and other changes may be made without departing from the scope of the present invention.

Figure 1:
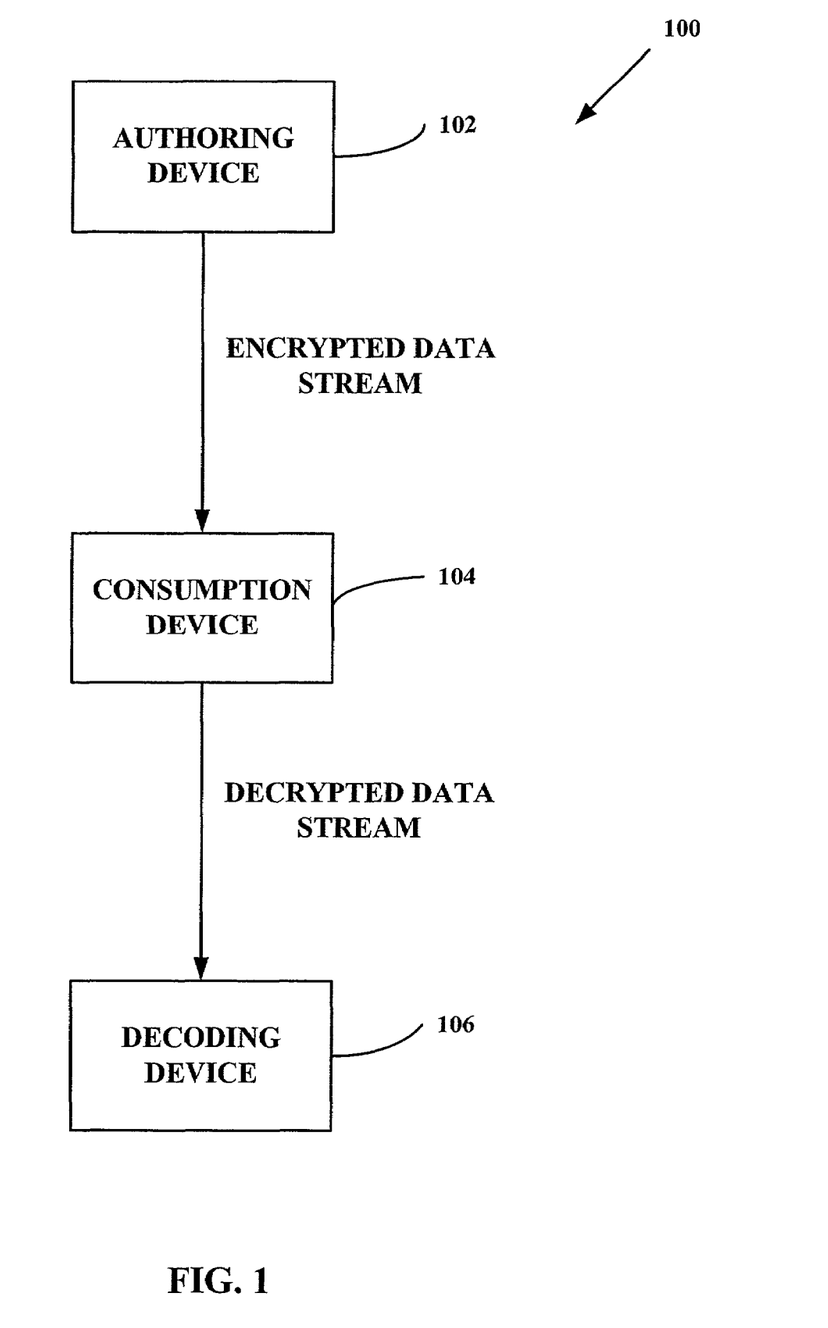
FIG. 1 shows a block diagram of a system embodiment of the present invention for transparently embedding non-compliant data in a data stream.

FIG. 1 shows a block diagram of a system embodiment of the present invention for transparently embedding non-compliant data in a data stream 100. The system 100 comprises an authoring device 102 and a consumption device 104. The authoring device 102 is any combination of hardware and/or software capable of authoring content and transmitting a data stream. Some examples of authoring devices 102 are Digital Versatile Disc (DVD) authoring systems, Compact Disc (CD) authoring systems, satellite and television broadcasting systems, streaming web video systems, and the like. The consumption device 104 is any combination of hardware and/or software capable of receiving a data stream and consuming content. Some examples of consumption devices 104 are DVD players, CD players, televisions, video cassette recorders (VCRs), Personal Computers (PCs), handheld devices, and the like.

In one embodiment, the authoring device 102 uses key information to encrypt a portion of a data stream and the consumption device 104 uses the key information to decrypt the portion of the data stream. Key information is any information useful to any cryptographic algorithm, such as one or more random numbers. The purpose of the key information is to make the encryption cipher non-repeatable. In another embodiment, the key information also includes other information such as navigation information, proprietary information, copy control information, copyright information, the identity of the source of the data stream, the client's account number, etc. In another embodiment, the key information changes on every frame or picture for video content. In this way, when it is played back, fast forwarded, or a random jump is made, the key information for each frame or picture is available. One example of a cryptographic algorithm is the Data Encryption Standard (DES), ANSI Data Encryption Algorithm (DEA), ANSI X3.92-1981 (R1998). Other examples are Rivest, Shamir, and Adleman (RSA) (See R. L. Rivest, A. Shamir, and L. M. Adleman, "A Method for Obtaining Digital Signatures and Public-Key Cryptosystems," Communications of the ACM, v. 21, n. 2, February 1978, pp. 120-126, Digital Signature Algorithm (DSA) Proposed Federal Information Processing Standard for Digital Signature Standard (DSS)," Federal Register, v. 56, n. 169, Aug. 30, 1991, pp. 42980-42982, and proprietary ciphers. In another embodiment, the system 100 further comprises a decoding device 106 in communication with the consumption device to decode the portion of the data stream. The decoding device 106 is any device capable of interpreting the data stream, such as an MPEG-compliant decoder.

In some embodiments, the decoding device 106 and the consumption device 104 are part of one system or device. In another embodiment, the consumption device 104 is capable of retrieving the key information from the portion of the data stream. In one embodiment, the authoring device 102 is a computer having a tool to create original data streams. The tool goes through the data stream and adds extra stuffing bytes to make room for key information, such as random numbers. The payload is encrypted and key information is put in on top of where the stuffing bytes were. Then, the content is transmitted to the consumption device 104. On the consumption device 104, generally, the reverse process is done. The data is processed, the key information is retrieved, the data stream is decrypted, the key information is replaced with stuffing bytes, and then the decrypted data stream is sent to a decoder. The decoder receives the packetized element stream (PES) header, the stuffing bytes, and the decrypted PES payload and then decodes as usual.

Figure 2:
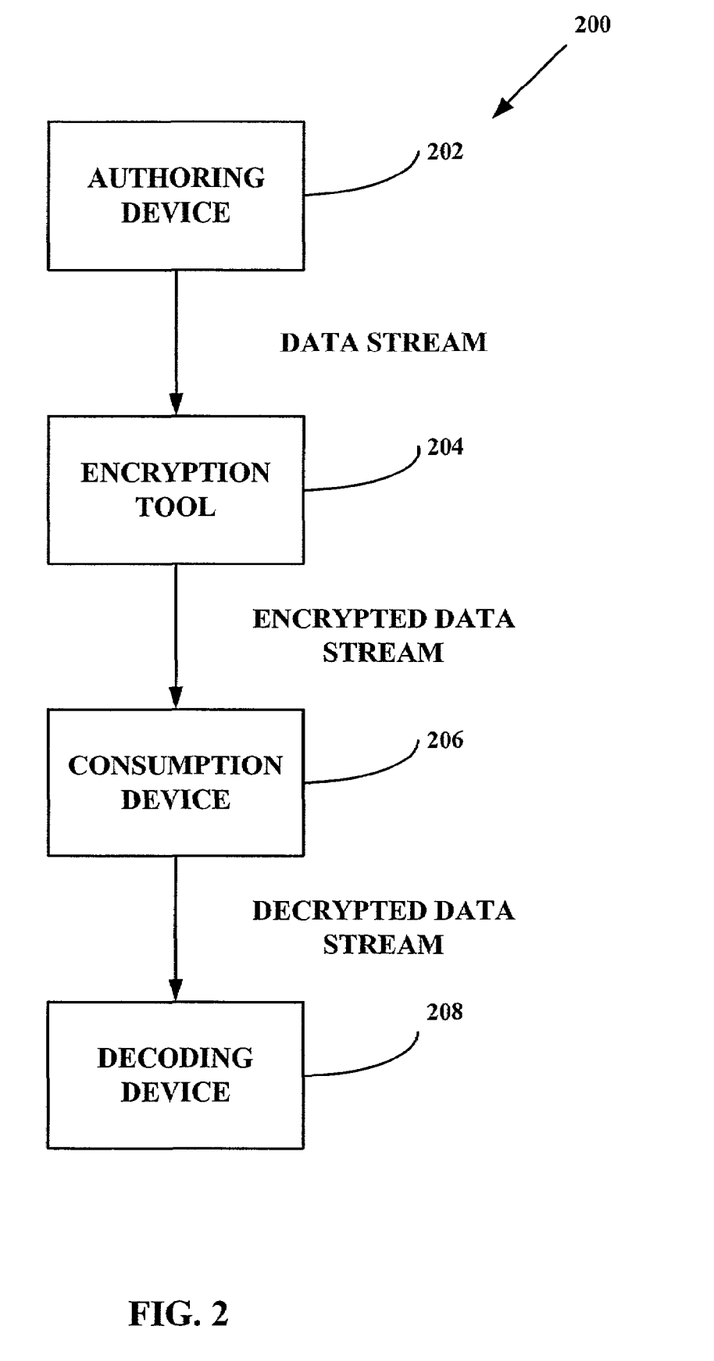
FIG. 2 shows a block diagram of an alternate system embodiment to FIG. 1.
Figure 3:
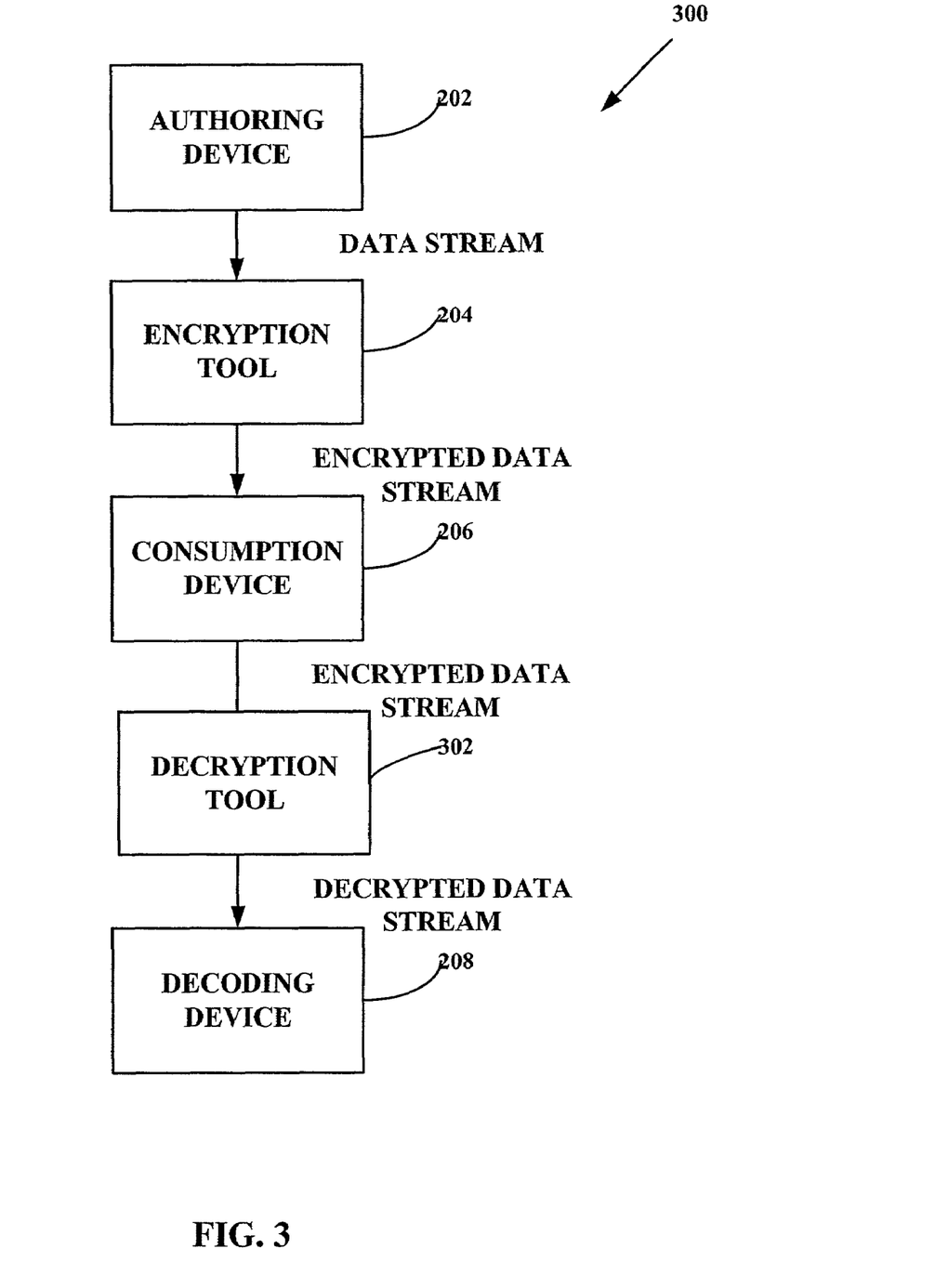
FIG. 3 shows a block diagram of an alternate system embodiment to FIGS. 1 and 2.

FIG. 2 shows a block diagram of an alternate system embodiment to FIG. 1. One system embodiment 200 comprises an authoring device 202, an encryption tool 204, and a consumption device 206. The authoring device 202 creates a data stream. The encryption tool 204 embeds key information near each synchronization point in the data stream and encrypts a portion of the data stream associated with each synchronization point. The consumption device 206 retrieves key information near each synchronization point in the data stream and replaces the key information with compliant data before the data stream is decrypted. In another embodiment, the system 200 farther comprises a decoding device 208 to decode the data stream. In another embodiment shown in FIG. 3, the system 300 farther comprises a decryption tool 302 to use the key information to decrypt the portion.

Figure 4:
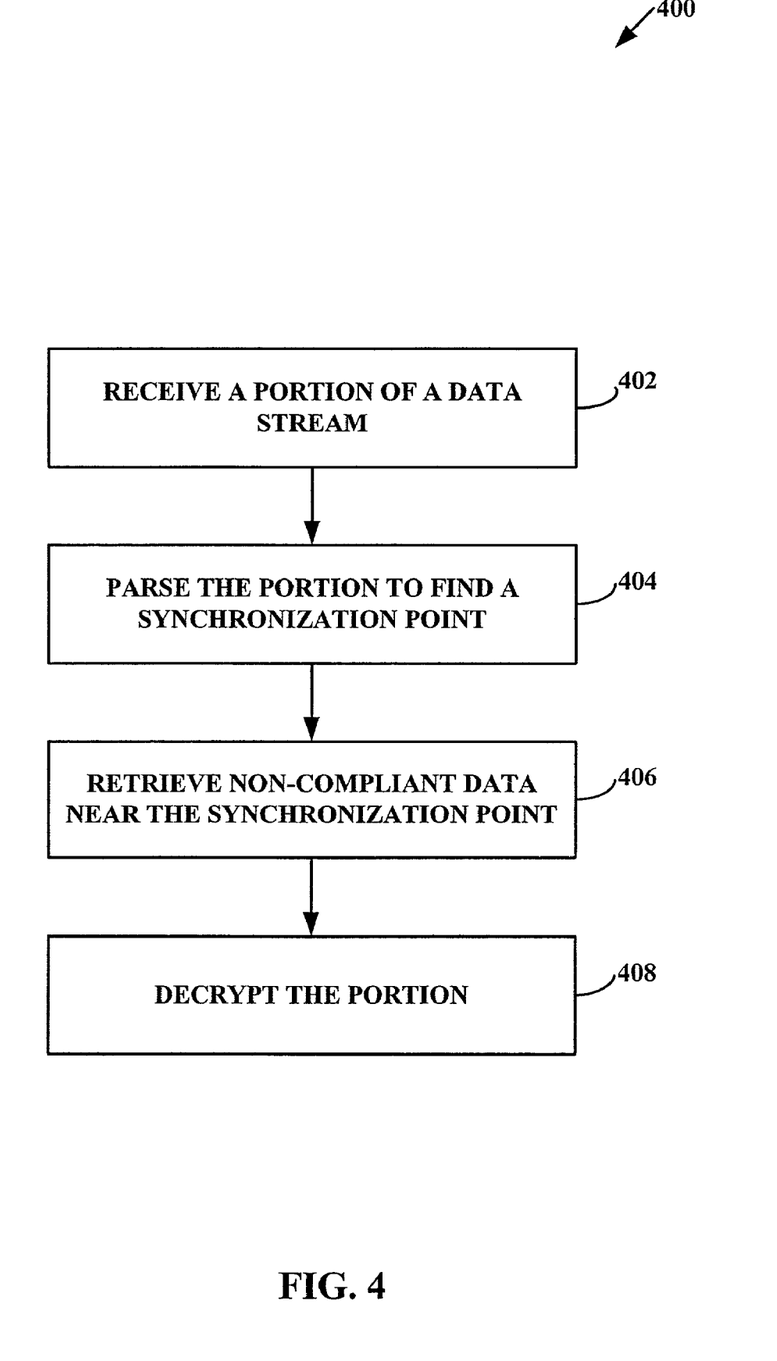
FIG. 4 shows a flow chart of a method embodiment of the present invention for transparently embedding non-compliant data in a data stream.

FIG. 4 shows a flow chart of a method embodiment of the present invention for transparently embedding non-compliant data in a data stream 400. Non-compliant data is data which does not strictly comply with a standard, such as one of the MPEG standards. The non-compliant data is, for example, navigation information or any other kind of information not strictly allowed by the standard. A portion of a data stream is received 402. The portion of the data stream is parsed to find a synchronization point within the data stream 404. An example of a synchronization point is a PES header. Non-compliant data near the synchronization point is retrieved 406. The portion of the data stream is decrypted 408. In another embodiment, the non-compliant data is key information that is used in decrypting. In another embodiment, the method 400 further comprises replacing the non-compliant data near the synchronization point with compliant data and decoding the portion of the data stream.

In one embodiment, the synchronization points comprise the PES headers. Every time the content has a new picture, there is a PES header, which is easy to find. Even if some data is lost, a receiving computer or a displaying computer realizes there is lost data or corrupted data and looks for the next PES header. Once the next PES header is found, everything is discarded up until that next PES header. That picture and subsequent data is decoded. The key information that was used to encrypt the content is in the PES header so that when the computer discarded data up until the next PES header, the key information needed to decrypt the current picture is in the current PES header.

Figure 5:
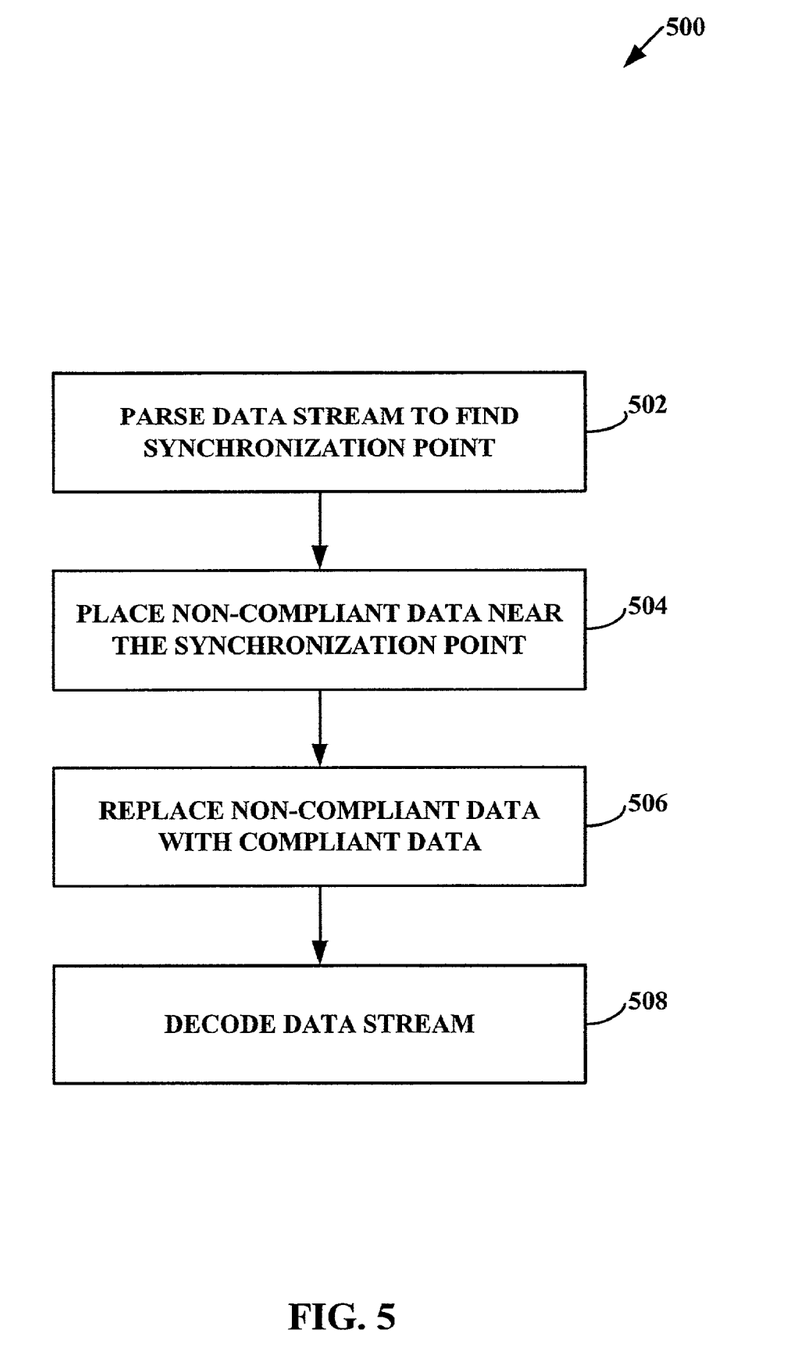
FIG. 5 shows a flow chart of an alternate method embodiment to FIG. 4.

FIG. 5 shows a flow chart of an alternate method embodiment 500 to FIG. 4. The method 500 comprises parsing a data stream to find a predefined synchronization point within the data stream 502 and placing non-compliant data near the synchronization point in the data stream 504. The data stream is decodable by a compliant decoder 508, after the non-compliant data is replaced with compliant data 506. An example of a predefined synchronization point is a header. In another embodiment, the method 500 further comprises encrypting a portion of the data stream and transmitting the portion of the data stream. In another embodiment, the method 500 further comprises decrypting the portion of the data stream. In another embodiment, the non-compliant data is key information that is used in encrypting and decrypting.

In one embodiment, a data stream is stored as a data file on a computer. Software executing on the computer parses through the data file to find all of the synchronization points or PES headers and evaluates each one to determine if there are sufficient stuffing bytes to hold key information or any other information desired to be embedded. If there are sufficient stuffing bytes, then nothing is done and the next synchronization point is processed. If there are not enough stuffing bytes then some are inserted between the PES header and the PES payload following the PES header. After processing the data file and inserting stuffing bytes, if needed, the new data is written out to a new file. Then the new file is encrypted. An encryption tool follows a similar process, searching to all the PES header synchronization points, making sure enough stuffing bytes are there, embedding key information, and then encrypting the payload for all the synchronization points in the new file. At this point, the encrypted file is transmitted from the authoring device to another device. Any method of transmission is acceptable including transmission over an Ethernet connection, over a satellite, over standard television airwave broadcasts, and the like. After transmission, the consumption device performs a similar process in reverse. First, the data is parsed looking for PES header synchronization points. When one is found, data is sent to a decryption component which retrieves key information and uses the key information to decrypt the payload associated with the PES header synchronization point. The decryption component replaces the key material with stuffing bytes as defined in the MPEG standards and the payload is, for example, decoded to make audio or video rendered for consumption.

Figure 6:
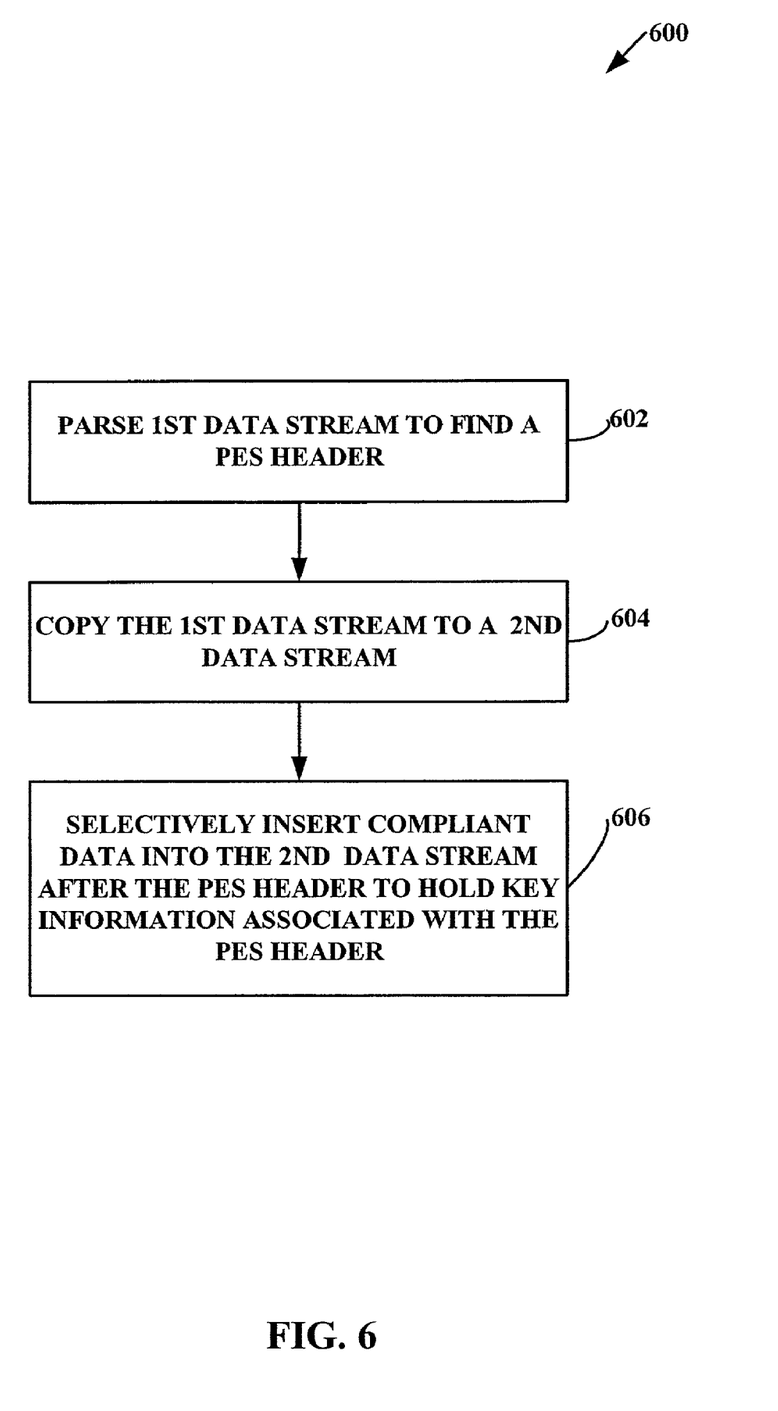
FIG. 6 shows a flow chart of an alternate method embodiment to FIGS. 4 and 5.

FIG. 6 shows a flow chart of an alternate method embodiment 600 to FIGS. 4 and 5. In one embodiment, a machine-accessible medium has associated content capable of directing the machine to perform the method 600. A first data stream is parsed to find a PES header 602. The PES header is associated with at least some payload data. The first data stream is copied to a second data stream 604. Compliant data is selectively inserted into the second data stream after the PES header to hold key information associated with the PES header 606. In another embodiment, the method 600 further comprises storing the first data stream and storing the second data stream. In another embodiment, the method 600 further comprises parsing the second data stream to find each PES header, embedding key information into each portion of the second data stream after each PES header, and encrypting each portion of the second data stream. In another embodiment, the method further comprises transmitting each portion of the second data stream. In another embodiment, the method further comprises retrieving key information from a portion of the second data stream, decrypting the portion of the second data stream with the key information, and replacing the key information with compliant data in the portion of the second data stream. In another embodiment, the method 600 further comprises decoding the portion.

Figure 7:
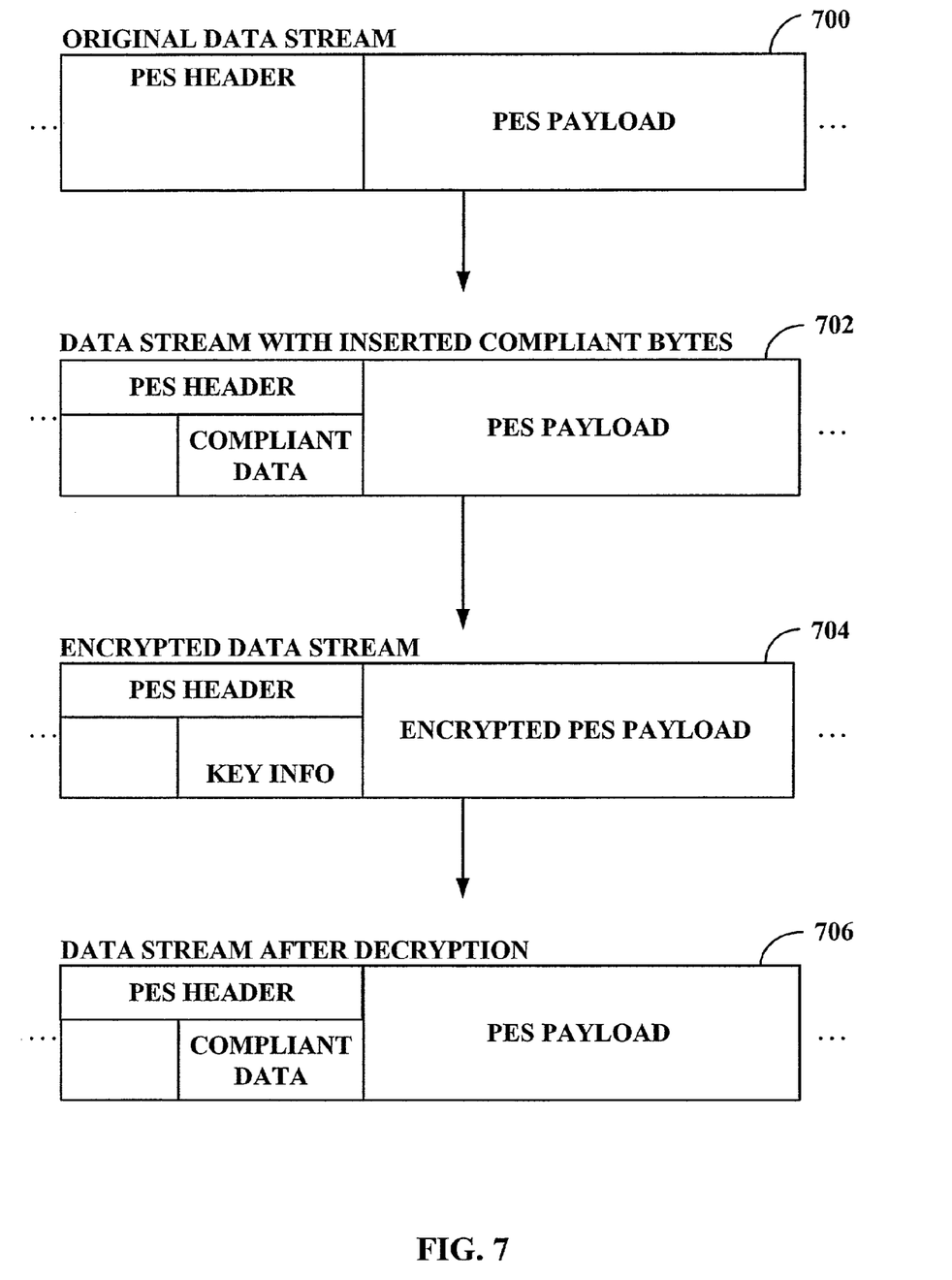
FIG. 7 shows a block diagram of various data structure embodiments of the present invention within data streams, including transparently embedded non-compliant data.

FIG. 7 shows a block diagram of various data structure embodiments of the present invention within data streams, including transparently embedded non-compliant data. To illustrate a sample data stream, a PES data stream is shown in FIG. 7, but embodiments include many different types of data streams. The original data stream 700 comprises a PES header and a PES payload. The original data stream 700 is capable of being processed by any MPEG-compliant decoder. The data stream with inserted compliant bytes 702 has compliant data inserted into the PES header. The data stream 702 is capable of being processed by any MPEG-compliant decoder. The encrypted data stream 704 has an encrypted PES payload. The stuffing bytes have been replaced with key information needed to synchronize decryption keys with the data stream. Because the PES payload is encrypted, it is not capable of being processed by any MPEG-compliant decoder. However, the PES header is decodable, if necessary. The data stream after decryption 706 has a decrypted PES payload. The key material has been used to perform decryption and then it was replaced with the original stuffing bytes, which are predefined in the MPEG standards. The data stream 706 is capable of being processed by any MPEG-compliant decoder. In one embodiment, the compliant data is defined as padding bytes either to make a data packet a certain size, to help alignment, or the like.

In some embodiments, data streams 700, 702, 704, and 706 are used to control access to multimedia video and audio data streams. By utilizing the stuffing bytes as defined in the MPEG standards, key information and navigation information is embedded without having to modify other components in a playback system that are not specifically involved in the encryption, decryption, and navigation processes. In another embodiment, there are stages that content goes through on a content preparation computer. The content in a format similar to the encrypted data stream 704 goes out over some transmission protocol, is received by a consumption device or playback computer. Then, the playback component and the decryption tool retrieve the key information and use it to re-initialize a cipher. The stuffing bytes are written back in and the payload is decrypted. Then, it is fed to the decoder which processes the data stream, ignoring all the stuffing bytes. In this way, the key information travels with the data stream from content preparation to content consumption, avoiding having to construct any kind of back door way of getting the information into the application.

Figure 8:
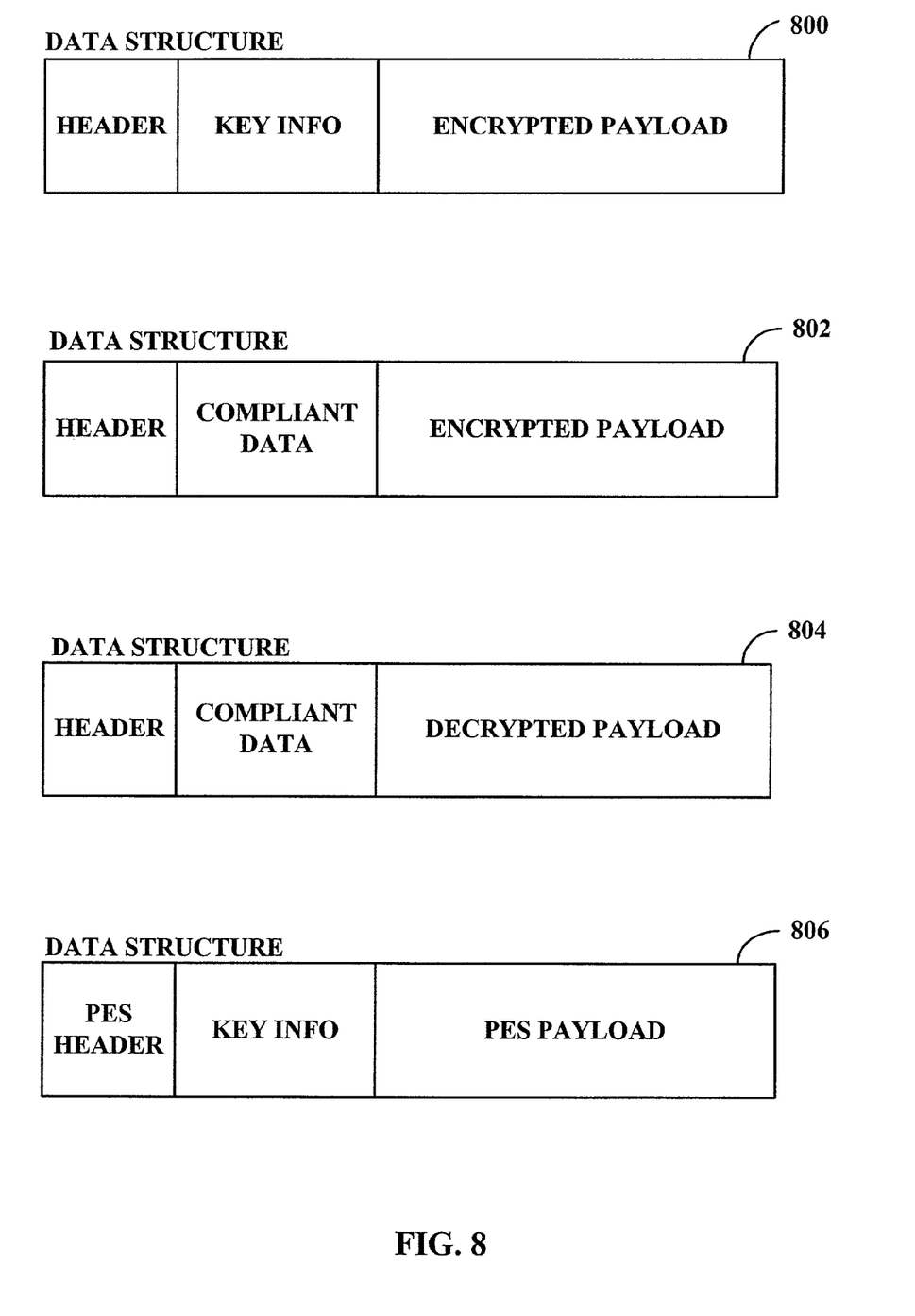
FIG. 8 shows a block diagram of various data structure embodiments of the present invention, including transparently embedded non-compliant data.

FIG. 8 shows a block diagram of various data structure embodiments of the present invention, including transparently embedded non-compliant data. In one embodiment, a data structure 800 comprises a header, key information associated with the header for use in decryption, and a payload associated with the header, the payload capable of being encrypted using the key information. In another embodiment 800, the key information in the header replace compliant data, after encryption. In another embodiment 802, compliant data replaces the key information associated with the header, before decryption. In another embodiment, 804, the header, compliant data, and decrypted payload are capable of being decoded by a compliant decoder. In another embodiment 806, the header is a PES header and the payload is a PES payload. In another embodiment, a data stream (such as the data streams 700, 702, 704, and 706 shown in FIG. 7) is stored on a machine-readable medium and comprises at least one data structure 800, 802, 804, or 806.

In another embodiment, spare bytes, stuffing bytes, and/or additional bytes as they are defined in the MPEG standards, 1994 are used for the PES headers to store key information. In this embodiment, a transmitting computer is capable of modifying the original data stream. The transmitting computer embeds the necessary additional information in each PES header that needs to be used as a key information synchronization point. The file is encrypted and the key information is embedded in the stuffing bytes. At this time the contents of the stuffing bytes do not conform to the MPEG standards, but that does not matter because only the decryptor on the receiving computer is capable of processing the data stream while the data is encrypted. The PES header, which contains the stuffing bytes is not encrypted, only the payload following the PES header is encrypted. During decryption on the receiving computer, the key information is retrieved from the stuffing bytes and the payload data is decrypted. Then, the stuffing bytes are modified to replace the key information with the appropriate data values to conform to the MPEG standards so that a playback component is capable of correctly processing the decrypted data stream. As a result, there is no need for a parallel data stream because the key information is stored directly in the MPEG stuffing bytes.

It is to be understood that the above description it is intended to be illustrative, and not restrictive. Many other embodiments are possible and some will be apparent to those skilled in the art, upon reviewing the above description. For example, other embodiments include any protocol or standard for transmitting data streams that defines synchronization points in a data stream, MPEG-1, MPEG-2, MPEG-4, future MPEG standards, various MPEG applications such as video phones, digital television broadcasting, compact-disc video (CD-Video), digital video disc (DVD), personal video recorders (PVR), networks, IEEE 1394-1995 interfaces, broadband networks, asynchronous transfer mode (ATM), and more. Other embodiments use spare, stuffing, padding, and other non-essential bytes for replacement. Therefore, the spirit and scope of the appended claims should not be limited to the above description. The scope of the invention should be determined with reference to the appended claims, along with the full scope of equivalents to which such claims are entitled.

What is claimed is:

1. A method, comprising:
   parsing a data stream to find a predefined synchronization point within a packetized elementary stream (PES) packet in the data stream; and
   placing non-compliant data in a stuffing bytes portion of the PES packet that is separate from the synchronization point and a payload in the PES packet;
   decoding the data stream by a compliant decoder, after the non-compliant data is replaced with compliant data.

2. The method as recited in claim 1, further comprising:
   encrypting a portion of the data stream; and
   transmitting the portion of the data stream.

3. The method as recited in claim 2, further comprising:
   decrypting the portion of the data stream.

4. The method as recited in claim 3, wherein the non-compliant data is key information that is used in encrypting and decrypting.

5. A method, comprising:
   receiving a portion of a data stream;
   parsing the portion of the data stream to find a synchronization point within a packetized elementary stream (PES) packet in the data stream;
   retrieving non-compliant data in a stuffing bytes portion of the PES packet that is separate from the synchronization point and a payload in the PES packet;
   replacing non-compliant data in the PES packet; and
   decrypting the portion of the data stream.

6. The method as recited in claim 5, wherein the non-compliant data is key information that is used in decrypting.

7. The method as recited in claim 5, further comprising:
   replacing the non-compliant data near the synchronization point with compliant data; and decoding the portion of the data stream.

8. A system, comprising:
   a hardware authoring device encrypting a portion of a data stream using key information, the key information being in a stuffing bytes portion of a packetized elementary stream (PES) packet that is separate from a synchronization point and a payload of the PES packet in the data stream; and
   a hardware consumption device in communication with the authoring device, the consumption device decrypting the portion of the data stream using the key information and replacing the key information with compliant data.

9. The system as recited in claim 8, further comprising:
   a decoding device in communication with the consumption device to decode the portion of the data stream.

10. The system as recited in claim 8, wherein the consumption device is configured to retrieve the key information from the portion of the data stream.

11. A system, comprising:
    a hardware authoring device to create a data stream;
    an encryption tool embedding key information in a stuffing bytes portion of a packetized elementary stream (PES) packet that is separate from each synchronization point and a payload of the PES packet in the data stream and encrypting a portion of the data stream associated with each synchronization point; and a hardware consumption device retrieving key information separate from each synchronization point and the payload of the PES packet in the data stream and replacing the key information with compliant data decrypting the data stream using the key information.

12. The system as recited in claim 11, further comprising:
a decoding device to decode the data stream.

13. The system as recited in claim 11, further comprising:
a decryption tool to use the key information to decrypt the portion.

14. A machine-accessible medium having a set of instructions stored thereon, which when executed cause a machine to perform a set of operations comprising:
parsing a first data stream to find a packetized elementary system (PES) header of a PES packet, the PES header associated with at least some payload data in the PES packet;
copying the first data stream to a second data stream;
selectively inserting compliant data into in a stuffing bytes portion of the second data stream after the PES header and separate from the at least some payload data, to hold key information associated with the PES header;
decrypting the portion of the second data stream with the key information; and
replacing the key information with compliant data in the portion of the second data stream.

15. The machine-accessible medium as recited in claim 14, wherein the method further comprises:
storing the first data stream; and
storing the second data stream.

16. The machine-accessible medium as recited in claim 14, wherein the method further comprises:
parsing the second data stream to find each PES header;
embedding key information into each portion of the second data stream after each PES header; and
encrypting each portion of the second data stream.

17. The machine-accessible medium as recited in claim 16, wherein the method further comprises:
transmitting each portion of the second data stream.

18. The machine-accessible medium as recited in claim 16, wherein the method further comprises:

retrieving key information from a portion of the second data stream;
decrypting the portion of the second data stream with the key information; and
replacing the key information with compliant data in the portion of the second data stream.

19. The machine-accessible medium as recited in claim 18, wherein the method further comprises:
decoding the portion.

20. A method, comprising:
transmitting a packetized elementary stream (PES) packet to a consumption device, the PES packet including
a header,
key information in a stuffing bytes portion that is separate from and associated with the header for use in decryption,
a payload associated with the header and separate from the key information, encrypting the payload using the key information; and
replacing the key information associated with the header, before decryption.

21. The method of claim 20 wherein the header, compliant data, and decrypted payload are capable of being decoded by a compliant decoder.

22. The method of calim 20, wherein the key information in the header replaces compliant data, after encryption.

23. The method of claim 20, wherein the header is a packetized elementary stream (PES) header and the payload is a PES payload.

24. A machine-readable medium, having a set of instructions stored thereon, which when executed cause a machine to perform a set of operations comprising:
transmitting a packetized elementary stream (PES) racket to a consumption device, the PES Dacket including
a header,
key information in a stuffing bytes portion separate from and associated with the header for use in decryption,
a payload associated with the header and separate from the key information, encrypting the payload using the key information; and replacing the key information associated with the header, before decryption.

* * * * *

UNITED STATES PATENT AND TRADEMARK OFFICE
CERTIFICATE OF CORRECTION

PATENT NO. : 7,570,766 B2 Page 1 of 1
APPLICATION NO. : 10/087576
DATED : August 4, 2009
INVENTOR(S) : Mangold et al.

It is certified that error appears in the above-identified patent and that said Letters Patent is hereby corrected as shown below:

In column 8, at line 34 delete, "Dacket" and insert --packet--.

Signed and Sealed this

Twelfth Day of October, 2010

David J. Kappos
*Director of the United States Patent and Trademark Office*